United States Patent
Kimura

(10) Patent No.: US 11,184,519 B2
(45) Date of Patent: Nov. 23, 2021

(54) IMAGE PICKUP APPARATUS, CONTROL METHOD OF IMAGE PICKUP APPARATUS, PROGRAM, AND STORAGE MEDIUM

(71) Applicant: CANON KABUSHIKI KAISHA, Tokyo (JP)

(72) Inventor: Hiroaki Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/791,177

(22) Filed: Feb. 14, 2020

(65) Prior Publication Data

US 2020/0275032 A1 Aug. 27, 2020

(30) Foreign Application Priority Data

Feb. 26, 2019 (JP) .............................. JP2019-032509

(51) Int. Cl.
*H04N 5/232* (2006.01)
*H04N 5/235* (2006.01)

(52) U.S. Cl.
CPC ..... *H04N 5/232121* (2018.08); *H04N 5/2351* (2013.01); *H04N 5/2353* (2013.01)

(58) Field of Classification Search
CPC ........... H04N 5/232121; H04N 5/2351; H04N 5/2353
See application file for complete search history.

(56) References Cited

U.S. PATENT DOCUMENTS

| | | |
|---|---|---|
| 7,693,409 B2 | 4/2010 | Morimoto |
| 8,531,587 B2 | 9/2013 | Kawarada |
| 10,341,567 B2 | 7/2019 | Ito |

(Continued)

FOREIGN PATENT DOCUMENTS

| | | |
|---|---|---|
| CN | 101034196 A | 9/2007 |
| CN | 101750846 A | 6/2010 |

(Continued)

OTHER PUBLICATIONS

The above patent documents were cited in a European Search Report dated Jul. 2, 2020, which is enclosed, that issued in the corresponding European Patent Application No. 20156674.2.

(Continued)

*Primary Examiner* — Ahmed A Berhan
(74) *Attorney, Agent, or Firm* — Cowan, Liebowitz & Latman, P.C.

(57) ABSTRACT

The image pickup apparatus comprises: a focus adjusting unit configured to drive a focus lens of an imaging optical system and perform focus adjustment; an exposure control unit configured to control exposure; a tilt angle acquiring unit configured to acquire a tilt angle that is a relative angle between an image pickup element and the image pickup optical system; a tilt angle control unit configured to control the tilt angle by tilting the image pickup element or the image pickup optical system; and an imaging condition acquiring unit configured to acquire a imaging condition of an image pickup apparatus. The tilt angle control unit determines a parameter related to a driving speed at which the image pickup element or the image pickup optical system is tilted based on the imaging condition acquired by the imaging condition acquiring unit.

13 Claims, 12 Drawing Sheets

(56) References Cited

U.S. PATENT DOCUMENTS

2010/0060748 A1   3/2010  Tsuchiya
2016/0261801 A1*  9/2016  Horikawa .......... H04N 5/23287
2017/0272657 A1   9/2017  Ito
2017/0272658 A1*  9/2017  Ito ............................ G02B 7/38

FOREIGN PATENT DOCUMENTS

| CN | 103824303 A | | 5/2014 |
|---|---|---|---|
| JP | 11-242152 A | | 9/1999 |
| JP | 2000-266985 A | | 9/2000 |
| JP | 2000266985 A | * | 9/2000 |

OTHER PUBLICATIONS

Sep. 2, 2021 Chinese Office Action, which is enclosed with an English Translation, that issued in Chinese Patent Application No. 202010120119.8.
US Patents documents 1 and 2 correspond to Foreign Patent Documents 2 and 3, respectively.

* cited by examiner

FIG. 5

| FOCAL LENGTH [mm] | 10 | 30 | 50 | 100 | 200 |
|---|---|---|---|---|---|
| DRIVING SPEED [° /sec] | 0.01 | 0.03 | 0.05 | 0.10 | 0.15 |
| PULSE FREQUENCY [kHz] | 1 | 3 | 5 | 10 | 15 |

IMAGE PICKUP APPARATUS, CONTROL METHOD OF IMAGE PICKUP APPARATUS, PROGRAM, AND STORAGE MEDIUM

BACKGROUND OF THE INVENTION

Field of the Invention

The present invention relates to an image pickup apparatus, a control method of the image pickup apparatus, a program, and a storage medium.

Description of the Related Art

Hitherto, there have been cases in which a monitoring camera is installed at a high place, where the optical axis of the camera is directed obliquely downward to monitor people passing on a road and pick up an image of a vehicle and a license plate thereof. In this case, the optical axis of the camera is directed downward. In image-pickup, a plane perpendicular to the optical axis is an in-focus focal plane, so that, in this case, the focal plane may not match the image pickup plane of an object to be actually shot. Thus, only a part of a screen showing the picked-up image is an in-focus region, while the rest of the region on the screen is out of focus.

To address this drawback, Japanese Patent Application Laid-Open No. 11-242152 discloses an image pickup apparatus that prioritizes a degree of focusing in a central region assuming that a main object is located in the center or determines a tilt angle of an image pickup element such that the tilt angle becomes an average value of positions of a plurality of objects if there is a difference in a tilt angle of the image pickup element in an in-focus state depending on the objects.

However, Japanese Patent Application Laid-Open No. 11-242152 does not disclose a driving speed at which the image pickup apparatus is tilted. Accordingly, if the image pickup element is tilted to detect a tilt angle at which a contrast value reaches a peak, the driving speed may be too fast to obtain an accurate peak, and thus the resolution may deteriorate or it may take a long time to detect the peak because the driving speed is too slow. Further, if a luminance gain (hereinafter, referred to as a "gain") that electrically adjusts a luminance is large, the peak may be erroneously detected.

SUMMARY OF THE INVENTION

The present invention provides focusing accurately and quickly in an image pickup apparatus that can change a tilt angle, which is a relative angle between an image pickup optical system and an image pickup element.

The present invention comprises: a focus adjusting unit configured to drive a focus lens of an imaging optical system and perform focus adjustment; an exposure control unit configured to control exposure; a tilt angle acquiring unit configured to acquire a tilt angle that is a relative angle between an image pickup element and the image pickup optical system; a tilt angle control unit configured to control the tilt angle by tilting the image pickup element or the image pickup optical system; and an imaging condition acquiring unit configured to acquire an imaging condition of an image pickup apparatus; wherein the tilt angle control unit determines a parameter related to a driving speed at which the image pickup element or the image pickup optical system is tilted based on the imaging condition acquired by the imaging condition acquiring unit.

Further features of the present invention will become apparent from the following description of experimental artifacts with reference to the attached drawings.

BRIEF DESCRIPTION OF THE DRAWINGS

FIG. 5 is a table illustrating a driving speed corresponding to a focal length.

DESCRIPTION OF THE EMBODIMENTS

A preferred embodiment of the present invention will now be described in detail with reference to the accompanying drawings.

First Embodiment

Figure 1:
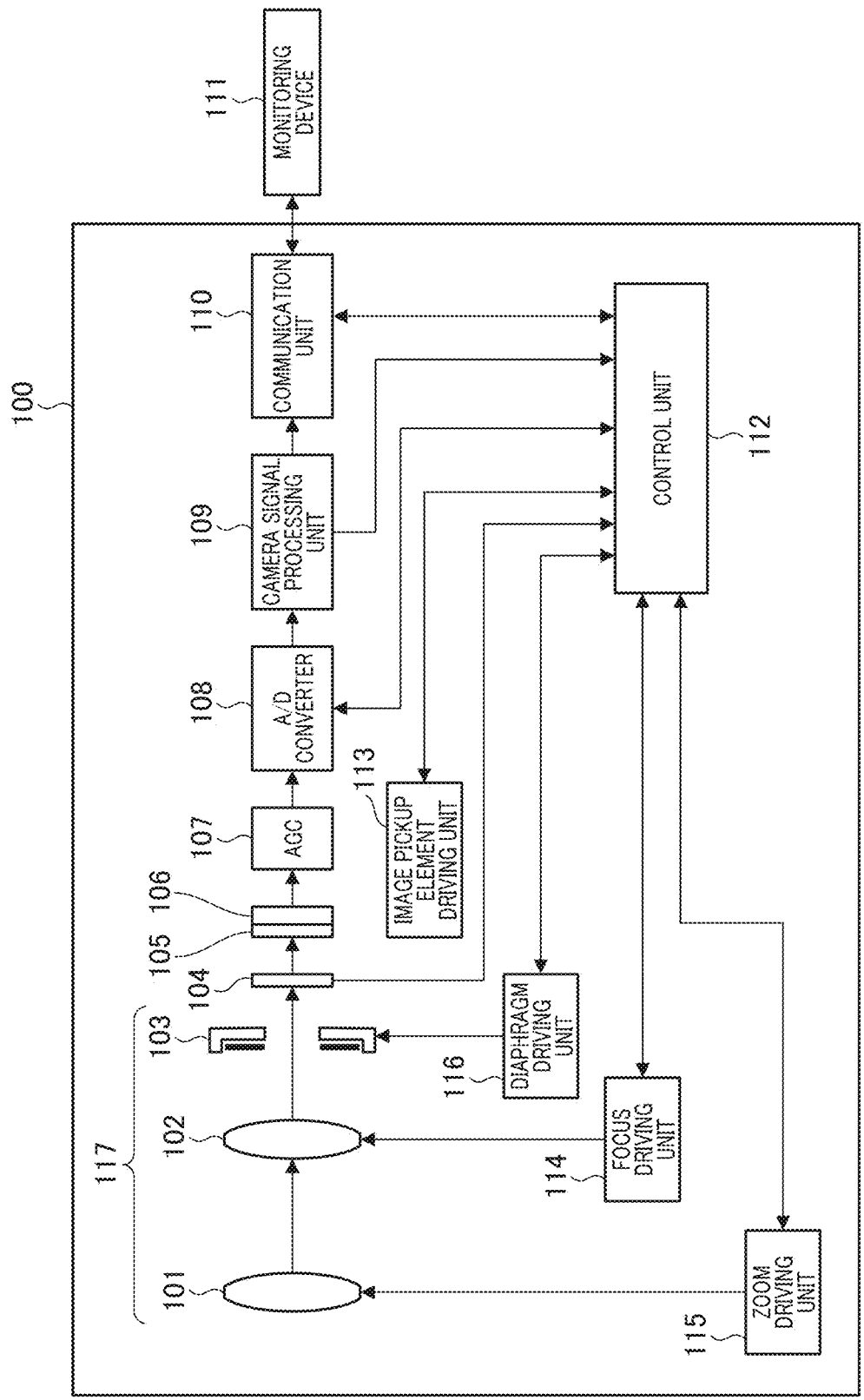
FIG. 1 is a block diagram illustrating a configuration example of an image pickup apparatus according to the first embodiment.

FIG. 1 is a block diagram illustrating a configuration example of an image pickup apparatus according to the first embodiment. An image pickup apparatus 100 includes an imaging optical system 117. The imaging optical system 117 includes a zoom lens 101 that moves in the optical axis direction and changes a focal length, a focus lens 102 that moves in the optical axis direction and performs focus adjustment, and a diaphragm unit 103 that adjusts an amount of light.

The light that has passed through the imaging optical system 117 forms an object image serving as an optical image on an image pickup element 106 via a band-pass filter (hereinafter, referred to as a "BPF") 104 and a color filter 105. The BPF 104 can move forward and backward with respect to an optical path of the imaging optical system. An object image is photoelectrically converted by the image pickup element 106.

An analog electric signal (image pickup signal) output from the image pickup element 106 is gain-adjusted by an AGC (Automatic Gain Control) circuit 107, converted into a digital signal by an A/D converter 108, and is input to a camera signal processing unit 109.

The camera signal processing unit 109 performs various image processes on the digital imaging signal to generate a video signal. Further, an RGB pixel value, a luminance value, and an evaluation value to be used in tilt control and auto focus (hereinafter, referred to as "AF") are passed to a control unit 112. Typically, the evaluation value is determined based on a contrast and a high frequency component of the image. Other means can also be used for determining the evaluation value if they can recognize the in-focus position, for example, a phase difference and reflected light including infrared light.

A video signal is output to a monitoring device 111 that is connected to the image pickup apparatus 100 by wired or wireless communication via a communication unit 110, and a control signal such as a command is output to the control unit 112 in the image pickup apparatus in response to an external command.

In accordance with an instruction from the communication unit 110, the control unit 112 calculates set values for focus control, tilt control, and exposure control in AF and manual focus (hereinafter, referred to as "MF") based on various evaluation values from the camera signal processing unit 109. Then, the control unit 112 provides an instruction about the setting values to the AGC circuit 107, an image pickup element driving unit 113, a focus driving unit 114, a zoom driving unit 115, and an diaphragm driving unit 116. Additionally, the control unit 112 calculates the current focal length, the current object distance, and the current diaphragm value based on the evaluation values and each position of the focus driving unit 114, the zoom driving unit 115, and the diaphragm driving unit 116.

The image pickup element driving unit 113 tilts the image pickup element 106 with respect to the optical axis of the imaging optical system 117 based on a setting value of the tilt angle that has been transmitted from the control unit 112. In most cases, a rotation axis that tilts the image pickup element 106 is positioned at the center of an imaging screen, and the image pickup element 106 is tilted around the rotation axis. In the present specification, a relative angle between the imaging optical system 117 and the image pickup element 106 is referred to as a "tilt angle". Additionally, the image pickup device element unit 113 is, for example, a stepping motor.

The focus driving unit 114 controls the position of the focus lens 102 based on a setting value of focusing that has been transmitted from the control unit 112. The zoom driving unit 115 controls the position of the zoom lens 101 based on the setting value of zooming that has been transmitted from the control unit 112. The diaphragm driving unit 116 controls the position of the diaphragm unit 103 based on the setting value of the diaphragm that has been transmitted from the control unit 112.

Figure 2:
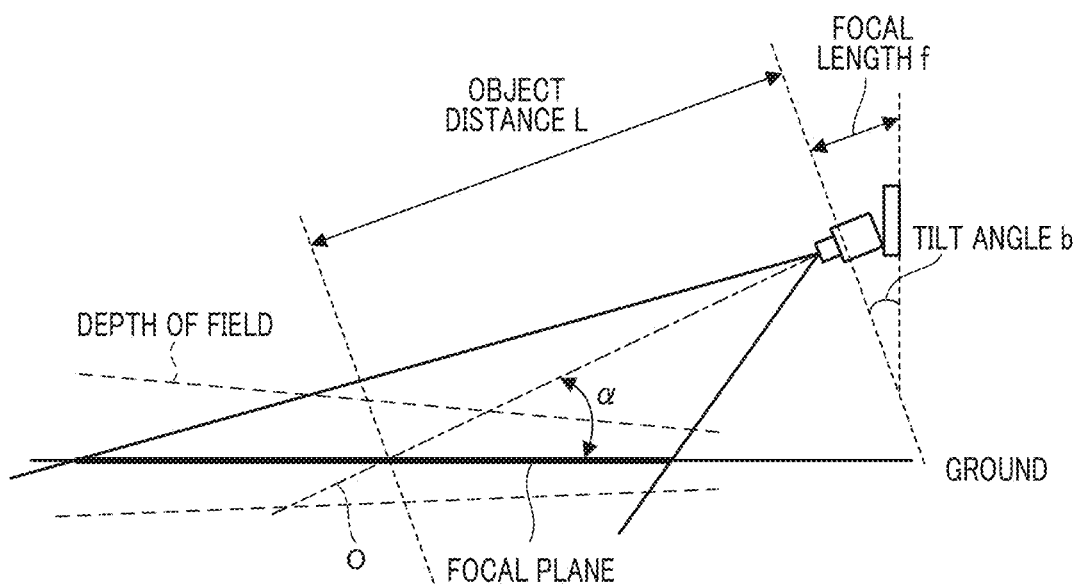
FIG. 2 illustrates a mechanism of tilt photography.

The control of the driving speed for the tilt angle will now be described. In order to simplify the description, as an example, the tilt angle is controlled by tilting the image pickup element 106. FIG. 2 illustrates a mechanism of the tilt photography. Here, the tilt photography is an imaging performed by increasing a depth of field for the viewing angle along the ground by a tilting focal plane by tilting the imaging optical system relative to the image pickup element or by tilting the image pickup element relative to the image pickup optical system. As shown in FIG. 2, assuming the focal length f, the object distance L, and the angle α between the optical axis O and the focal plane before zooming, the tilt angle h is calculated by the following formula (1) based on the Scheimpflug principle.

[Formula 1]

$$b=\tan^{-1}(f/(L \tan \alpha)) \quad (1)$$

Where f=10 [mm], L=10,000 [mm], and α=30 [°] are set, b=0.2 [°] is obtained by the formula (1). Alternatively, where f=100 [min], L=10,000 [mm], and α=30 [°] are set, b=1.98 [°] is obtained.

Figure 3:
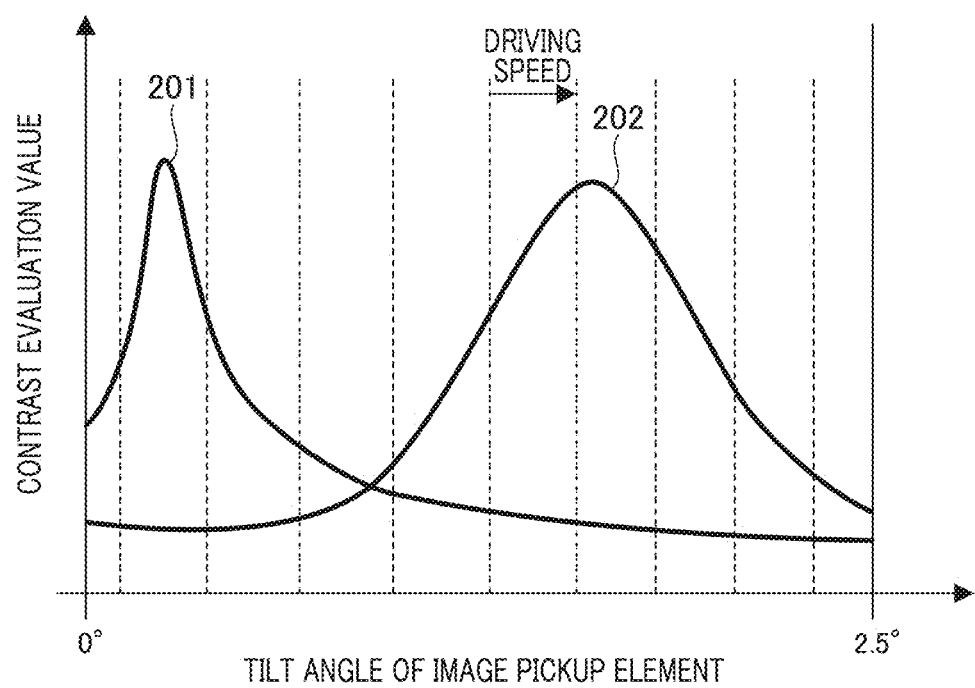
FIG. 3 illustrates the relation between a tilt angle of an image pickup element and a contrast evaluation value.

FIG. 3 illustrates the relation between the tilt angle of the image pickup element 106 and a contrast evaluation value. Reference numeral 201 indicates f=10 [mm] and reference numeral 202 indicates f=100 [mm]. For example, if the driving speed at which the image pickup element 106 is tilted is set constant, where f=100 [mm] (202) is set, the contrast evaluation value changes relatively slowly in accordance with the tilt angle of the image pickup element 106. Hence, it is relatively easy to search for the peak position of the contrast evaluation value within the depth of field. However, where f=10 [mm] (201) is set, the contrast evaluation value changes steeply compared with the case of f=100 [mm]. Therefore, the peak in the depth of field is detected in difficulty, and there is a fear that a position having a poor resolution, in other words, a position where the contrast evaluation value does not reach a peak, may be erroneously detected to serve as the peak position.

Figure 4:
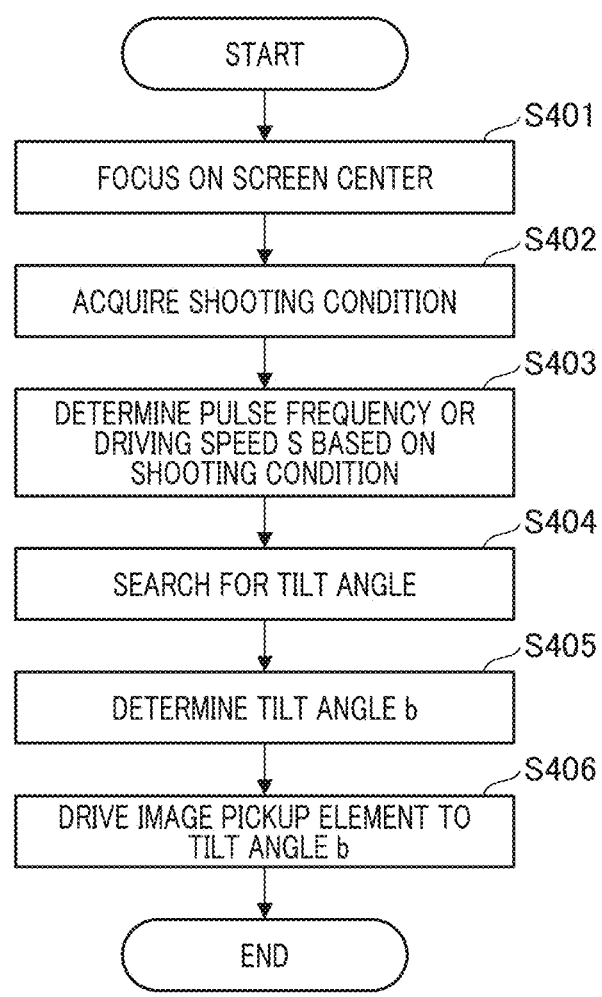
FIG. 4 is a flowchart illustrating tilt control processing according to the first embodiment.

Accordingly, in the present embodiment, a parameter related to the driving speed at which the image pickup element 106 is tilted is determined based on imaging conditions. The parameter related to the driving speed is, for example, the pulse frequency of the stepping motor. FIG. 4 is a flowchart illustrating the tilt control processing according to the first embodiment. With reference to the flowchart shown in FIG. 4, the flow of the tilt angle control processing performed by the control unit 112 in the present embodiment will be described. Note that the control unit 112 executes the present processing in accordance with a tilt angle correcting control program serving as a computer program.

In step S401, the control unit 112 drives the focus lens 102 so as to be focused on the center of the screen. Focusing can be performed by using either auto focus or manual focus.

In step S402, the control unit 112 acquires imaging conditions. Here, the imaging conditions comprise information including at least one of a focal length, an object distance, an angle between the optical axis and a focal plane (hereinafter, referred to as a "focal plane angle"), a diaphragm, and gain information. Here, a case where the imaging condition is information about the focal length will be described as an example. The current focal length f is obtained by the control unit 112 based on, for example, the current zooming position and the current focusing position.

In step S403, the pulse frequency or the driving speed S at which the image pickup element 106 is tilted is determined based on the information about the focal length that has been acquired in step S402. FIG. 5 is a table illustrating the pulse frequency and the driving speed corresponding to the focal length. The pulse frequency or the driving speed S may be determined by using, for example, a table illustrating the pulse frequency and the driving speed that have been determined based on the focal length as shown in FIG. 5.

As shown in FIG. 3, the contrast evaluation value changes steeply as the focal length becomes shorter, whereas the contrast evaluation value changes slowly as the focal length becomes longer. Hence, the peak of the contrast evaluation value can be quickly and accurately searched for by setting the driving speed S of the image pickup element 106 to be slower as the focal length becomes shorter, and setting the driving speed S of the image pickup element 106 to be faster as the focal length becomes longer.

The appropriate driving speed S of the image pickup element 106 may be calculated by using the focal length. In the calculation, as an example, assuming that the angle between the optical axis and the focal plane is changed by the angle θ, and where the focal length f0 and the object distance L are set, the tilt angle b is obtained by the following formula (2):

[Formula 2]

$$\tan b = f0/(L \cdot \tan θ) \quad (2)$$

Where the focal length is denoted by "f", the tilt angle b' is obtained by the following formula (3):

[Formula 3]

$$\tan b' = f/(L \cdot \tan θ) \quad (3)$$

Where the value b is small, b=tan b is established, so that the following formulae (4) and (5) are established.

[Formula 4]

$$b = f0/(L \cdot \tan θ) \quad (4)$$

[Formula 5]

$$b' = f/(L \cdot \tan θ) \quad (5)$$

"S0" is denoted as a proper driving speed at which the image pickup element 106 is tilted at the focal length f0, in other words, a driving speed at which the peak of the contrast evaluation value can be accurately detected. If the image pickup element 106 attempts to move by the angle θ at the focal length f for the time period that is the same as that in the focal length f0, the driving speed S is represented by the following formula (6):

[Formula 6]

$$S = S0 \cdot (f/f0) \quad (6)$$

The description will return to FIG. 4. In step S404, the image pickup element 106 is driven and tilted with the pulse frequency or the driving speed S determined in step S403 to search for a tilt angle at which the contrast evaluation value reaches a peak. As an example of a method for searching for the tilt angle at which the contrast evaluation value reaches a peak, the image pickup element 106 may be tilted to measure the tilt angle at which the contrast evaluation value indicating a state of contrast of a video image signal calculated based on the video image signal at a certain image height position of the image pickup element 106 reaches the peak. However, the present invention is not limited to this, and another method may be used as long as the tilt angle at which the contrast evaluation value reaches a peak can be detected.

Alternatively, the image pickup element 106 may be manually driven and tilted to visually search for a tilt angle at which the contrast reaches a peak. In this case, the control unit 112 changes, for example, a driving amount of the image pickup element 106 per an operation amount of the operation unit for driving the image pickup element 106 to serve as a driving speed. Specifically, for example, the driving amount of the image pickup element 106 per the operation amount of the operation unit is reduced as the focal length is shorter, and the driving amount of the image pickup element 106 per the operation amount of the operation unit is increased as the focal length is longer. Thus, searching for the peak of the contrast evaluation value quickly and accurately is enabled.

In step S405, the control unit 112 determines the tilt angle b at which the contrast evaluation value reaches a peak.

In step S406, the control unit 112 drives and tilts the image pickup element 106 so as to attain the tilt angle b that has been determined in step S405. At this time, since the tilt angle b has been determined in step S405, the control unit 112 can shorten the driving time by driving the image pickup element 106 to the tilt angle b at a speed higher than the driving speed while searching, for example, at the highest speed within a controllable range. Subsequently, the process ends. According to the present embodiment, it is possible to search for an appropriate tilt angle depending on imaging conditions.

In the present embodiment, in order to simplify the description, as an example, although the tilt angle is controlled by tilting the image pickup element 106, the tilt angle may be controlled by providing a driving unit for tilting the image pickup optical system 117 and by tilting the imaging optical system 117 with respect to the normal line of the image pickup element 106. Moreover, the tilt angle may be controlled by tilting both the image pickup element 106 and the imaging optical system 117. In these cases, the driving speed at which the image pickup element 106 is tilted can be replaced with a driving speed at which the imaging optical system 117 is tilted or a driving speed at which both the image pickup element 106 and the imaging optical system 117 are tilted. The same also applies to the following embodiments.

Second Embodiment

In the first embodiment, the example has been illustrated in which the parameter related to the driving speed of the image pickup element 106 or the imaging optical system 117 when the tilt angle is changed is determined based on one of the imaging conditions. In the second embodiment, an example of determining the parameter related to the driving speed at Which the image pickup element 106 is tilted based on the imaging conditions will be described. The detailed description about the configuration the same as that of the first embodiment will be omitted.

Figure 6:
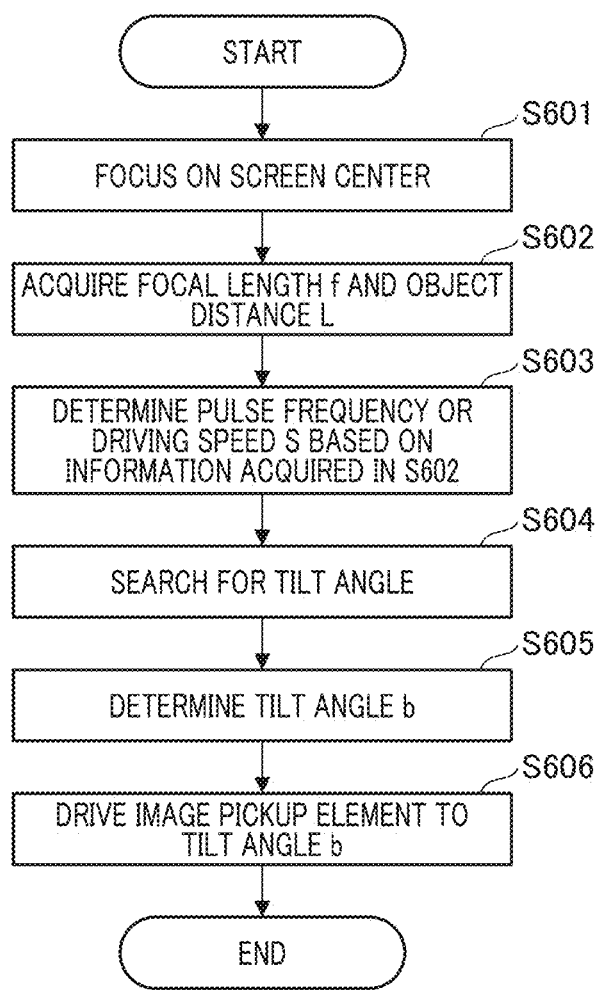
FIG. 6 is a flowchart illustrating the tilt control processing according to the second embodiment.

FIG. 6 is a flowchart illustrating the tilt control processing according to the second embodiment. A description will be given of the flow of the tilt angle control processing performed by the control unit 112 according to the present embodiment with reference to the flow chart shown in FIG. 6. The difference from first embodiment 1 is a series of processes from step S602 to step S603, and therefore, mainly this difference will be described.

In step S602, the control unit 112 acquires a plurality of imaging conditions. In the present embodiment, although a description will be given by using the focal length information and object distance information to serve as an example of the combination of the imaging conditions, other combinations, for example, the combination of the focal length information and the aperture information, the combination of the object distance information, the aperture information, and the gain information can be used, and the present invention is not limited to these.

With reference to the focal length information and object distance information, the control unit 112 acquires the current focal length f and object distance L based on the current zooming position and the current in-focus position. In addition, it is also conceivable to use, for example, an imaging plane phase difference AF by which a defocusing amount can be recognized in order to obtain the object distance L.

In step S603, the pulse frequency or the driving speed S at which the image pickup element 106 is tilted is determined based on the information (here, the focal length f and the object distance L) that has been acquired in step S602.

The pulse frequency or the driving speed S may be determined by using a table or the like, which shows the pulse frequency and the driving speed that has been determined based on the focal length and the object distance as in the first embodiment.

Additionally, the appropriate pulse frequency or the appropriate driving speed S of the image pickup element 106 may be calculated by using the focal length and the object distance. As an example, in a calculation, "S0" denotes a proper driving speed at which the image pickup element 106 is tilted, where the focal length is f0 and the object distance is L0. If the image pickup element 106 attempts to move by the same angle and for the same time period as those in the focal length f0 and the object distance L0, at the focal length f and the object distance L, the driving speed S is obtained by the following formula (7) (Intermediate expressions in the formula are the same those in the first embodiment):

[Formula 7]

$$S = S0 \cdot \left(\frac{f}{f0}\right) \cdot \left(\frac{L0}{L}\right) \quad (7)$$

According to the present embodiment, even if there are a plurality of imaging conditions, searching for an appropriate tilt angle is enabled.

Third Embodiment

In the first and second embodiments, an example is described in which the parameter related to the driving speed of the image pickup element 106 or the imaging optical system 117 when the tilt angle is changed is set based on the imaging conditions. In the first and second embodiments, it is possible to perform focusing accurately and quickly by using a simple process. However, if the current tilt angle is different even at the same focal length and the object distance, an amount for driving the image pickup element 106 or the imaging optical system 117 is different even if the focal plane angle is moved by the same amount.

Figure 7:
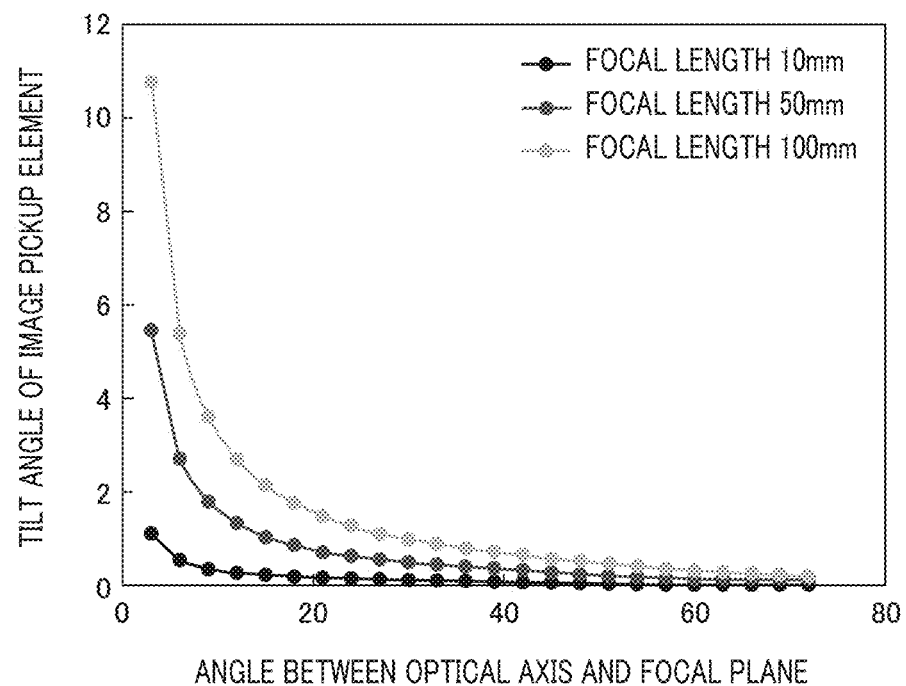
FIG. 7 illustrates the relation between the tilt angle of the image pickup element and a focal plane angle.

FIG. 7 illustrates the relation between the tilt angle of the image pickup element 106 and the focal plane angle. FIG. 7 illustrates the relation between the tilt angle of the image pickup element 106 and the focal plane angle, where L=10,000 [mm] and f=10 [mm], 50 [mm], and 100 [mm] are set.

For example, if the focal plane angle is moved by −3°, from 60° to 57°, where f=100 [mm] is set, the image pickup element 106 only has to be moved by 0.04°, whereas if the focal plane angle is moved by −3° from 30° to 27°, the image pickup element 106 must be moved by 0.12°. Specifically, if the image pickup element 106 is moved at a constant speed without considering the angle of the focal plane, the amount of displacement of the angle between the optical axis and the focal plane per unit of time decreases as the tilt angle increases, so that the amount of variation of the contrast evaluation value decreases, and thereby a malfunction in the searching operation may occur.

Therefore, in the present embodiment, as the tilt angle increases, the driving speed at which the image pickup element 106 is tilted is increased, in other words, the pulse frequency is increased to set the amount of displacement of the focal plane angle per unit of time so as to be constant, and the amount of variation of the contrast evaluation value is increased to thereby suppress malfunctioning in the searching operation.

Figure 8:
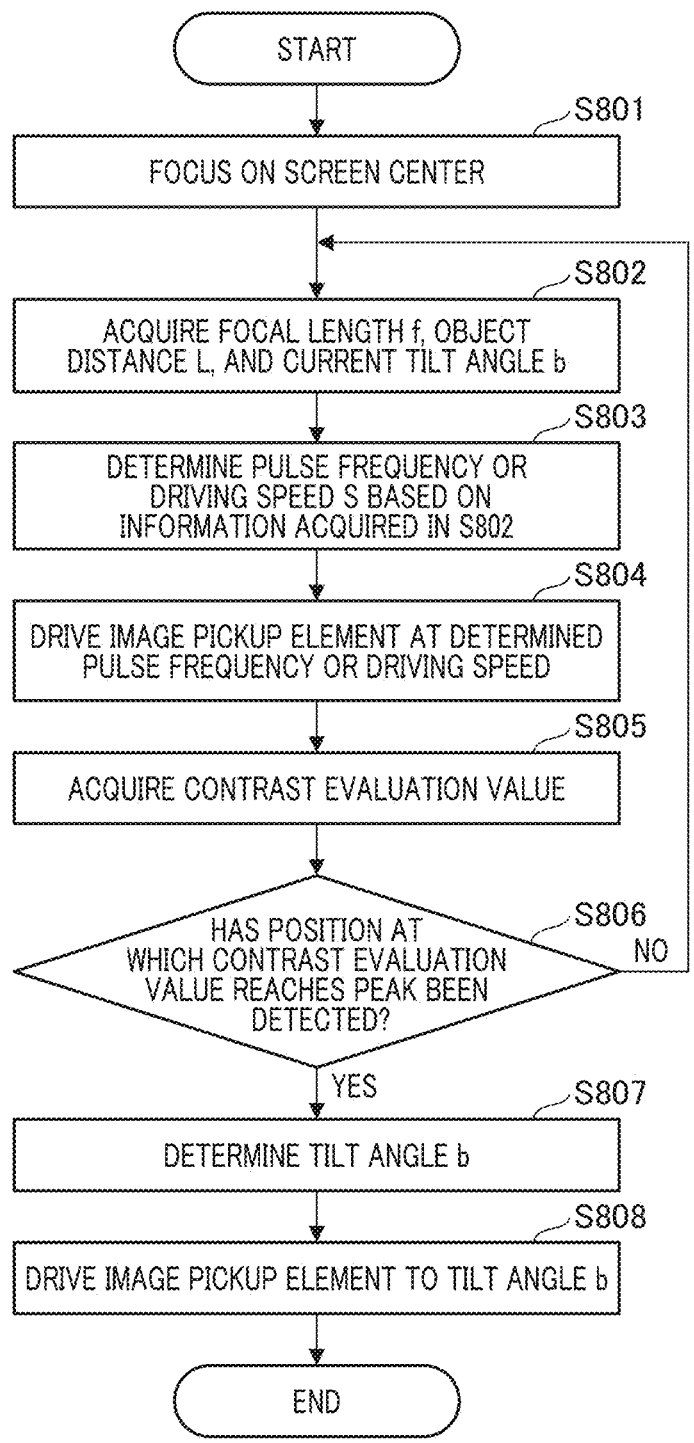
FIG. 8 is a flowchart illustrating the tilt control processing according to the third embodiment.

FIG. 8 is a flowchart illustrating the tilt control processing according to the third embodiment. With reference to the flowchart shown in FIG. 8, the flow of the tilt angle control processing performed by the control unit 112 in the present embodiment will be described. Since the difference from the first embodiment is a series of processes from step S802 to step S806, mainly this difference will be described. In step S802, the control unit 112 acquires imaging conditions. Here, as an example, the focal length f and the object distance L are acquired to serve as imaging conditions, and the current tilt angle b is acquired. Here, one imaging condition may be used as described in the first embodiment or a plurality of imaging conditions may be used as described in the second embodiment.

In step S803, the pulse frequency or the driving speed S at which the image pickup element 106 is tilted is determined based on the information (here, the focal length, the object distance, and the current tilt angle b) that has been acquired in step S802.

The pulse frequency or the driving speed S may be determined by using a table or the like that shows the pulse frequency and the driving speed determined based on the focal length, the object distance, and the tilt angle, or may be calculated by using the focal length, the object distance, and the tilt angle.

In step S804, the image pickup element 106 is driven with the pulse frequency or the driving speed that has been determined in step S803.

In step S805, the contrast evaluation value at the position of the tilt angle at which the image pickup element 106 is driven is acquired. In step S806, it is determined whether or not a position at which the contrast evaluation value reaches a peak has been detected. The determination condition may be in effect over the entire drivable range when the image pickup element 106 is tilted, or the contrast evaluation value is lowered in comparison to the previous position by minute driving (hereinafter, referred to as "wobbling driving" is performed).

If it is determined in step S806 that the peak position has not been obtained (NO), the process returns to step S802. If the peak position has been acquired in step S806 (YES), the process proceeds to step S807.

According to the present embodiment, a displacement amount of the angle between the optical axis and the focal plane per unit time is kept constant by changing the parameter related to the driving speed at which the image pickup element 106 or the imaging optical system 117 is tilted based on the size of the current tilt angle, and a variation amount of the contrast evaluation value is increased, as a result, searching for an appropriate tilt angle is enabled.

Fourth Embodiment

There is a case in which it takes a long time to search for the position of the tilt angle at which the contrast evaluation value reaches a peak by operating over the entire range in the tilting operation of the image pickup element can be allowed. Accordingly, in the fourth embodiment, the search range when the peak position of the contrast evaluation value is searched for is limited by acquiring at least one of the three imaging conditions (a group of imaging conditions), the focal length, the object distance, and the focal plane angle used in the Scheimpflug principle, thereby reducing the time required for search.

Here, a case in which two imaging conditions, the focal length information and the object distance information, can be acquired will be described. As for the combination of the imaging conditions, any combination may be allowed if two of the three imaging conditions, the focal length, the object distance, and the focal plane angle, are used. Alternately, the acquisition of only one imaging condition of the three imaging conditions is also allowed.

Figure 9:
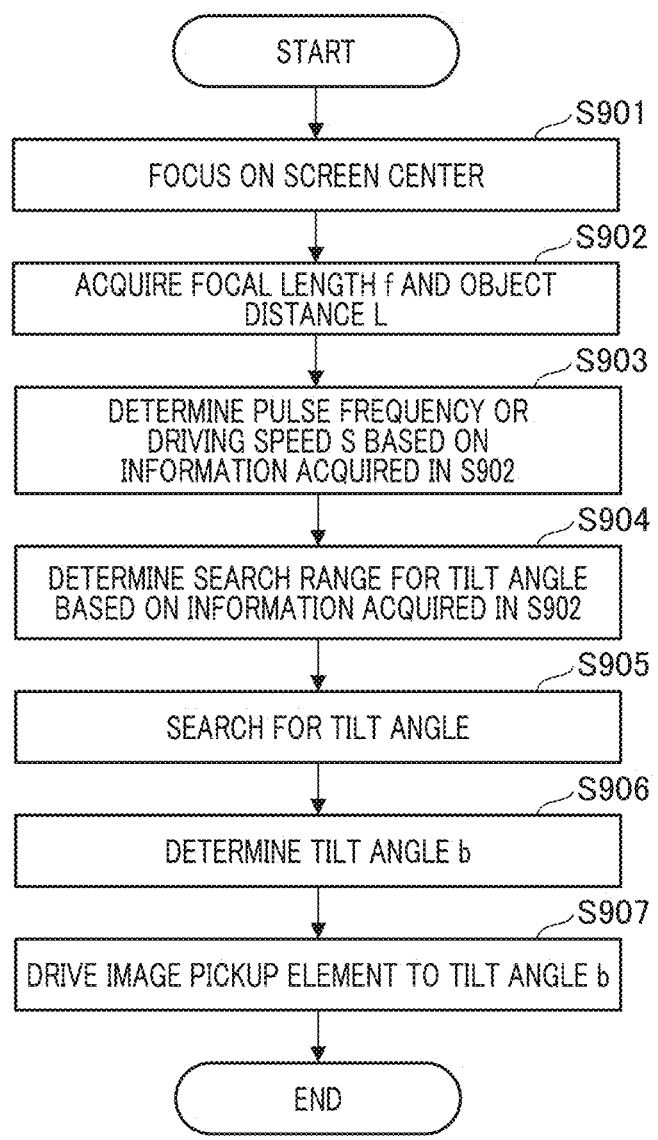
FIG. 9 is a flowchart illustrating the tilt control processing according to the fourth embodiment.

FIG. 9 is a flowchart illustrating the tilt control processing according to the fourth embodiment. With reference to the flowchart shown in FIG. 9, the flow of the tilt angle control processing performed by the control unit 112 in the present embodiment will be described. If a plurality of imaging conditions (here, the focal length and the object distance) is acquired from among the three imaging conditions, the focal length, the object distance, and the focal plane angle, the difference from the second embodiment is a process in step S904, and therefore, this difference will be mainly described.

In step S904, a range of a realistic focal plane angle is set, and a search range for an angle at which the image pickup element 106 is tilted is limited based on the obtained focal length f and the object distance L. In the mimicry, for example, if the focal plane angle is around 0°, the objects can be in the depth of field regardless of the distance between the object positioned in the front and the object positioned in the rear so that there is almost no effect of tilting. Accordingly, the range of the focal plane angle α is set to 3° to 90° instead of 0° to 90°. In such a case, the search range, where f=100 [mm] and L=10,000 [mm] are set, becomes 10.08° to 0° based on the Scheimpflug principle. Where f=10 [mm] and L=10,000 [mm] are set, the search range is 1.01° to 0°.

According to the present embodiment, the search range during search for the peak position of the contrast evaluation value can be limited, and as a result, the search time can be reduced.

Fifth Embodiment

In the fifth embodiment, an example of determining the parameter related to the driving speed when the tilt angle is changed based on the image height at the position where the contrast evaluation value is acquired. If the image pickup element 106 is tilted with respect to the optical axis of the imaging optical system 117, the in-focus position at the rotation center of the image pickup element 106 (the optical axis) is unchanged, and the amount of displacement of the in-focus position increases as the image height increases away from the center of the rotation. Hence, if the peak position of the contrast evaluation value is searched for at a position having a high image height, there are cases in which the peak position cannot be detected even if the tilt angle is changed at an optimum driving speed. Further, if the peak position of the contrast evaluation value is searched for at a position having a low image height, the amount of displacement of the in-focus position is reduce so that the variation of the contrast evaluation value is reduced, and as a result, a malfunction in the searching operation may occur.

Figure 10:
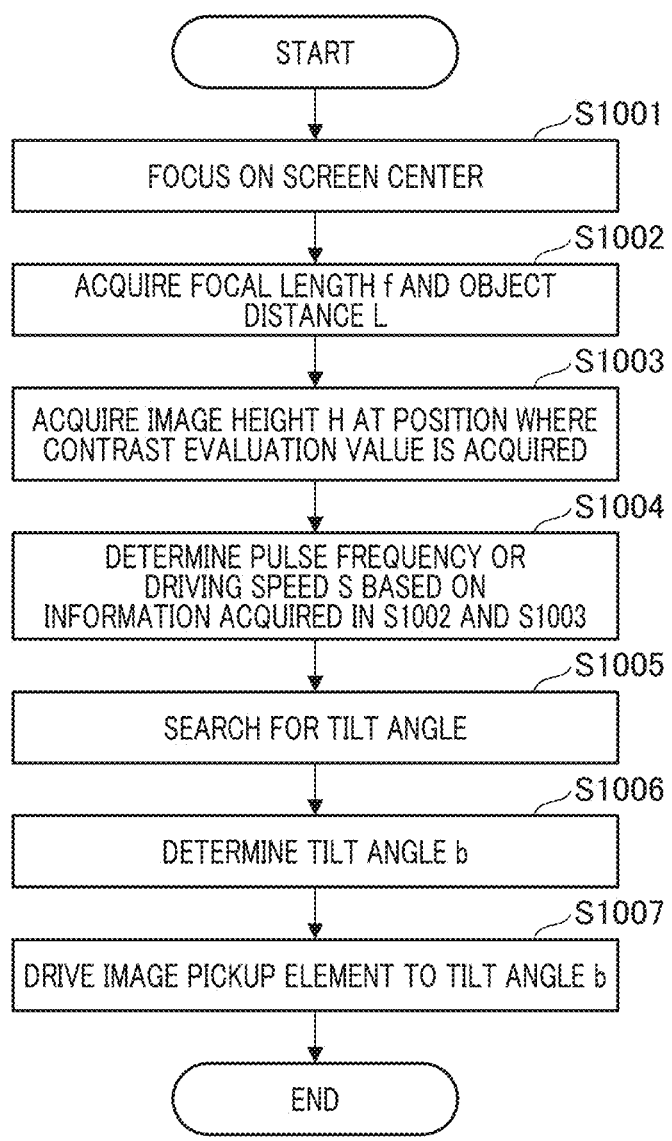
FIG. 10 is a flowchart illustrating the tilt control processing according to the fifth embodiment.

FIG. 10 is a flowchart that illustrates the tilt control processing according to the fifth embodiment. With reference to the flowchart shown in FIG. 10, the flow of the tilt angle correction control processing performed by the control unit 112 in the present embodiment will be described. In the present embodiment, an example in which the focal length f and the object distance L are obtained to serve as imaging conditions will be described. Here, one imaging condition may be used as described in the first embodiment or a plurality of imaging conditions may be acquired as described in the second embodiment. If the imaging conditions (here, the focal length and the object distance) are acquired, the difference from the second embodiment is a sequence of processes from step S1003 to step S1004, and thus, mainly this difference will be described.

In step S1003, the control unit 112 acquires the image height at the position where the contrast evaluation value is acquired. In step 1004, the pulse frequency or the driving speed S at which the image pickup element 106 is tilted is determined based on the imaging condition(s) that has been acquired in step S1002 and the image height that has been acquired in step S1003. The driving speed S is set to be lower as the image height increases or the driving speed S is set to be higher as the image height decreases. The pulse frequency is set to be lower as the image height increases or the pulse frequency is set to be higher as the image height decreases. Specifically, the control unit 112 decreases the driving speed S as the image height is higher, and increases the driving speed S as the image height is lower. Additionally, the control unit 112 decreases the pulse frequency as the image height is higher, and increases the pulse frequency as the image height is lower. The pulse frequency or the driving speed S may be determined by using a driving speed table or the like determined based on the image height.

Additionally, the driving speed S may be calculated by using the image height. In calculation of the driving speed S by using the image height, for example, if "S0" denotes the proper driving speed at which the image pickup element 106 is tilted in a case where the contrast evaluation value is obtained at the position of the image height H0 with the focal length f and the object distance L, the driving speed S when the contrast evaluation value at the image height H is acquired is obtained by the following formula (8).

[Formula 8]

$$S = S0 \cdot (H/H0) \tag{8}$$

It is possible to equalize the amounts of displacement of the in-focus position at the image height H and at the image height H0 by moving the image pickup element at the above driving speed.

According to the present embodiment, even if there is a difference in the position of the image height at which the contrast evaluation value is acquired, the driving speed when the tilt angle is changed is adjusted based on the image height, and as a result, searching for an appropriate tilt angle is enabled.

Sixth Embodiment

In the sixth embodiment, the position at which the contrast evaluation value reaches a peak is calculated based on the object distance at the center of the screen, the object distance at one point other than the center of the screen, the image height position, and the focal length, and the image pickup element is moved to the position and then to start searching, and thereby the search time is shortened.

Figure 11:
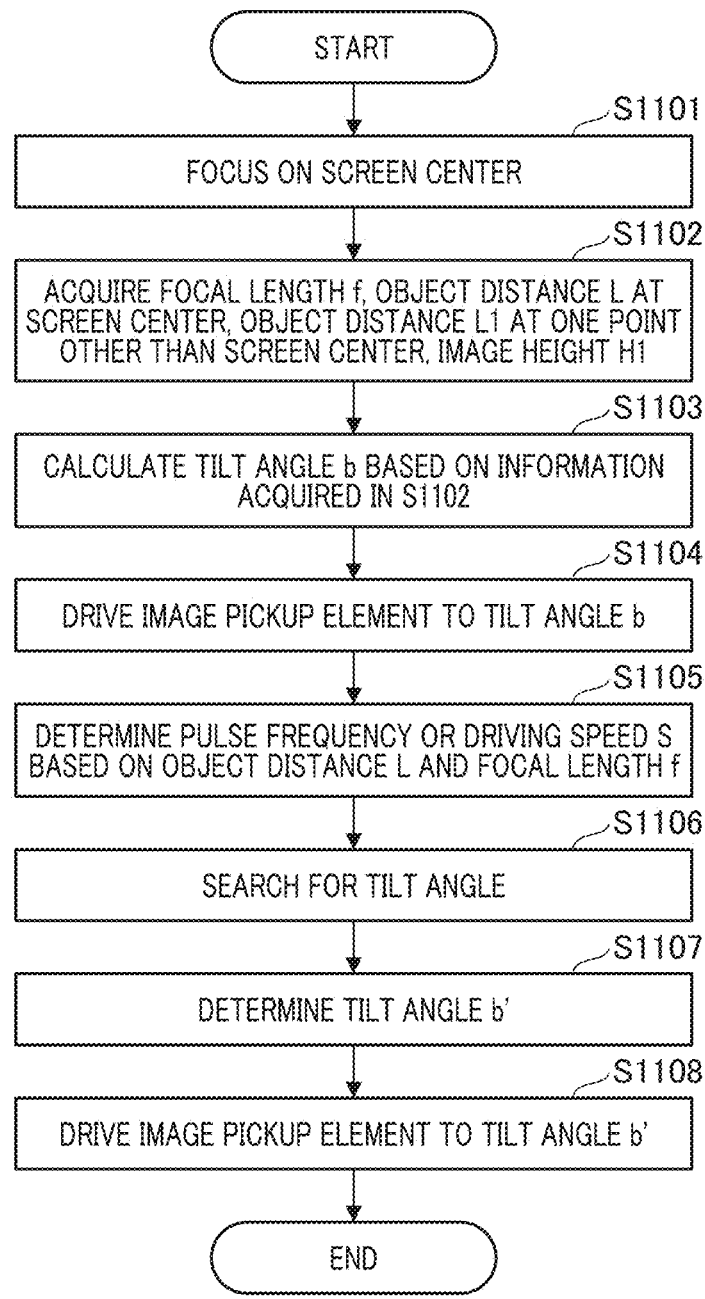
FIG. 11 is a flowchart illustrating the tilt control processing according to the sixth embodiment.

FIG. 11 is a flowchart illustrating the tilt control processing according to the sixth embodiment. With reference to the flowchart shown in FIG. 11, the flow of the tilt angle control processing performed by the control unit 112 in the present embodiment will be described. The difference from the second embodiment is a series of processes from step S1102 to step S1104, and thus, mainly this difference will be described.

In step S1102, the object distance L at the center of the screen, the focal length f, and the object distance L1 at a point other than the center of the screen, and an image height H1 are acquired. In step S1103, a tilt angle h is acquired based on the information that has been acquired in step S1102.

Figure 12:
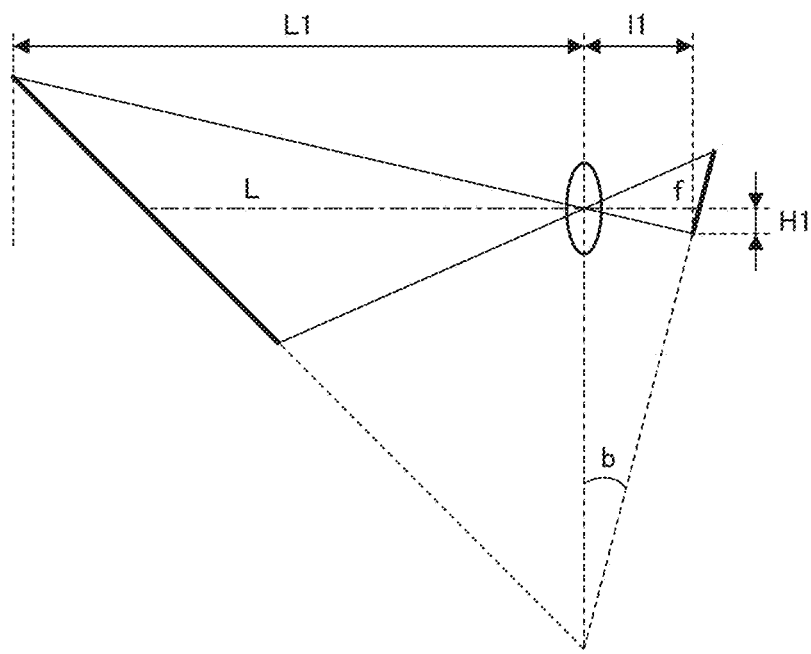
FIG. 12 illustrates a method for calculating a tilt angle according to the sixth embodiment.

FIG. 12 illustrates a method for calculating a tilt angle according to the sixth embodiment. As shown in FIG. 12, if the focal length f, the object distance L at the center of the screen, the object distance L1 at the first point that is a point other than the center of the screen, the image height H1 at the first point, and a distance I1 between the image pickup element 106 and the imaging optical system 117 at the first point are defined, the following formulae (9) (10) are established based on the Scheimpflug principle in order to calculate the tilt angle b.

[Formula 9]

$$I1 = fL1/(L1-f) \quad (9)$$

[Formula 10]

$$b = \tan^{-1}((f-I1)/H1) \quad (10)$$

It is conceivable for the acquisition of the object distance at the first point to use for example, the imaging plane phase difference AF from which a defocus amount is recognized is conceivable.

In step S1104, the image pickup element 106 is driven to reach the tilt angle b that has been obtained by the calculation using the above formula, in other words, the tilt angle h at which the theoretical contrast evaluation value reaches a peak. At this time, since the theoretical tilt angle b has been determined, there is no need to search. Therefore, the image pickup element 106 can be driven at the highest speed within a controllable range.

In step S1105, the pulse frequency or the driving speed S is determined as in the second embodiment. Subsequently, in step S1106, the image pickup element 106 is driven and tilted with the pulse frequency or the driving speed S that has been determined in step S1105 in order to search for a tilt angle at which the contrast evaluation value reaches a peak. Since there is an error in the object distance and the focal length, the tilt angle b at which the theoretical contrast evaluation value reaches a peak may deviate from a tilt angle at which the actual theoretical contrast evaluation value reaches a peak. Therefore, in step S1106, a search is performed in the vicinity of the tilt angle b that has been calculated in step S1104, and a tilt angle b', at which the actual contrast evaluation value reaches a peak, is detected.

According to the present embodiment, since it is possible to move the image pickup element at the highest speed within a controllable range without performing search for an area around the peak position, the search time can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s), The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-032509, filed Feb. 26 2019, which is hereby incorporated by reference wherein in its entirety.

What is claimed is:

1. An image pickup apparatus comprising a processor executing computer instructions stored in memory or circuitry operating as:
   a tilt angle control unit configured to control a tilt angle by tilting an image pickup element or an image pickup optical system, wherein the tilt angle is an angle formed between an imaging plane of the image pickup element and a plane orthogonal to an optical axis of the image pickup optical system;
   an imaging condition acquiring unit configured to acquire an imaging condition of the image pickup apparatus; and
   a determining unit configured to determine a driving speed at which the image pickup element or the image pickup optical system is tilted based on the imaging condition acquired by the imaging condition acquiring unit,
   wherein the driving speed is the speed when the tilt angle control unit determines a tilt angle at which a contrast evaluation value reaches a peak by tilting the image pickup element or the image pickup optical system.

2. The image pickup apparatus according to claim 1, wherein the tilt angle control unit determines the driving speed during change of the tilt angle to the tilt angle at which a contrast evaluation value reaches a peak that has been detected in the search, to be faster than the driving speed during the search.

3. The image pickup apparatus according to claim 1, further comprising
   a tilt angle acquiring unit configured to acquire the tilt angle,
   wherein the tilt angle control unit determines the driving speed based on the tilt angle acquired from the tilt angle acquiring unit.

4. The image pickup apparatus according to claim 1, further comprising
   a tilt angle acquiring unit configured to acquire the tilt angle, wherein the tilt angle control unit determines the driving speed so that the driving speed is faster in accordance with the increase in the tilt angle acquired from the tilt angle acquiring unit.

5. The image pickup apparatus according to claim 1, wherein the imaging condition includes at least one of focal length information of the image pickup optical system, object distance information serving as information about a distance to an object, focal plane angle information serving as angle information between an optical axis of the imaging optical system and a focal plane, aperture amount information, and information about luminance gain.

6. The image pickup apparatus according to claim 5, wherein the imaging condition acquiring unit acquires at least one piece of information from among one group of imaging conditions including the focal length information, the object distance information, and the focal plane angle information, and
wherein the tilt angle control unit limits a search range during the search by limiting a range of the imaging condition that has not been acquired by the imaging condition acquiring unit based on the imaging condition that has been acquired by the imaging condition acquiring unit among the one group of the imaging conditions.

7. The image pickup apparatus according to claim 1, wherein the tilt angle control unit determines the driving speed during the search based on an image height for which the search is performed.

8. The image pickup apparatus according to claim 7, wherein the tilt angle control unit determines the driving speed so that the driving speed is slower as the image height is higher during the search.

9. The image pickup apparatus according to claim 1, wherein the tilt angle control unit calculates a tilt angle at which a contrast evaluation value reaches a peak based on the object distance information at the center of the image and at one point other than the center of the image, an image height at the one point, and the focal length information, and searches for the tilt angle at which a contrast evaluation value reaches a peak in proximity to the calculated angle.

10. The image pickup apparatus according to claim 1, further comprising an exposure control unit configured to control exposure, wherein the exposure control unit controls the exposure by controlling at least one of an aperture, a luminance gain, and an exposure time.

11. A control method of an image pickup apparatus comprising:
acquiring an imaging condition of the image pickup apparatus;
controlling a tilt angle by tilting an image pickup element or an image pickup optical system wherein the tilt angle is an angle formed between an imaging plane of the image pickup element and a plane orthogonal to an optical axis of the image pickup optical system; and
determining a driving speed at which the image pickup element or the image pickup optical system is tilted based on an imaging condition that has been acquired in the acquisition of an imaging condition,
wherein the driving speed is the speed when a tilt angle at which a contrast evaluation value reaches a peak by tilting the image pickup element or the image pickup optical system is determined.

12. A non-transitory storage medium on which is stored a computer program for making a computer execute a method for an image pickup apparatus, the method comprising:
acquiring an imaging condition of the image pickup apparatus;
controlling a tilt angle by tilting an image pickup element or an image pickup optical system, wherein the tilt angle is an angle formed between an imaging plane of the image pickup element and a plane orthogonal to an optical axis of the image pickup optical system; and
determining a driving speed at which the image pickup element or the image pickup optical system is tilted based on an imaging condition that has been acquired in the acquisition of an imaging condition,
wherein the driving speed is the speed when a tilt angle at which a contrast evaluation value reaches a peak by tilting the image pickup element or the image pickup optical system is determined.

13. An image pickup apparatus comprising a processor executing computer instructions stored in memory or circuitry operating as:
a tilt angle control unit configured to control a tilt angle by tilting an image pickup element or an image pickup optical system, wherein the tilt angle is an angle formed between an imaging plane of the image pickup element and a plane orthogonal to an optical axis of the image pickup optical system;
a tilt angle acquiring unit configured to acquire the tilt angle; and
an imaging condition acquiring unit configured to acquire an imaging condition of the image pickup apparatus;
wherein the tilt angle control unit determines a driving speed at which the image pickup element or the image pickup optical system is tilted based on the imaging condition acquired by the imaging condition acquiring unit
so that the driving speed is faster in accordance with the increase in the tilt angle acquired from the tilt angle acquiring unit.

* * * * *